(12) United States Patent
Tansel

(10) Patent No.: US 10,055,450 B1
(45) Date of Patent: Aug. 21, 2018

(54) EFFICIENT MANAGEMENT OF TEMPORAL KNOWLEDGE

(71) Applicant: Abdullah Uz Tansel, New York, NY (US)

(72) Inventor: Abdullah Uz Tansel, New York, NY (US)

(73) Assignee: Abdullah Uz Tansel, New York, NY (US)

( * ) Notice: Subject to any disclaimer, the term of this patent is extended or adjusted under 35 U.S.C. 154(b) by 831 days.

(21) Appl. No.: 14/462,612

(22) Filed: Aug. 19, 2014

(51) Int. Cl.
*G06F 17/30* (2006.01)

(52) U.S. Cl.
CPC .. *G06F 17/30386* (2013.01); *G06F 17/30091* (2013.01)

(58) Field of Classification Search
CPC .............. G06F 17/30386; G06F 17/30091
USPC ............................................. 707/758, 790
See application file for complete search history.

(56) References Cited

U.S. PATENT DOCUMENTS

| | | | |
|---|---|---|---|
| 7,707,160 B2 * | 4/2010 | Tunstall-Pedoe | G06F 17/30654 707/999.103 |
| 7,979,455 B2 * | 7/2011 | Krishnamoorthy | G06F 17/30427 707/761 |
| 8,145,690 B2 * | 3/2012 | Mitchell | G06F 17/30309 707/942 |
| 8,458,191 B2 * | 6/2013 | Bhattacharjee | G06F 17/30595 707/747 |
| 8,489,649 B2 * | 7/2013 | Yalamanchi | G06F 17/30312 707/803 |
| 8,527,517 B1 * | 9/2013 | Ait-Mokhtar | G06F 17/30292 707/738 |
| 8,719,250 B2 * | 5/2014 | Chong | G06F 17/30477 707/713 |
| 9,633,006 B2 * | 4/2017 | Ryu | G06F 17/30401 |
| 9,785,725 B2 * | 10/2017 | Srinivasan | G06F 17/30958 |
| 9,805,076 B2 * | 10/2017 | Yalamanchi | G06F 17/30507 |
| 2003/0135520 A1 * | 7/2003 | Mitchell | G06F 17/30309 |
| 2006/0190461 A1 * | 8/2006 | Schaefer | G06F 17/30604 |
| 2006/0235823 A1 * | 10/2006 | Chong | G06F 17/30477 |
| 2009/0043827 A1 * | 2/2009 | Mitchell | G06F 17/30309 |
| 2009/0138498 A1 * | 5/2009 | Krishnamoorthy | G06F 17/30427 |
| 2010/0318558 A1 * | 12/2010 | Boothroyd | G06F 17/30731 707/769 |
| 2013/0232143 A1 * | 9/2013 | Ait-Mokhtar | G06F 17/30292 707/736 |
| 2015/0347485 A1 * | 12/2015 | Cai | G06F 17/30914 707/743 |
| 2016/0371355 A1 * | 12/2016 | Massari | G06F 17/30557 |
| 2017/0199928 A1 * | 7/2017 | Zhao | G06F 17/30654 |

* cited by examiner

*Primary Examiner* — Sheree N Brown

(57) ABSTRACT

A knowledge base system is provided for storing and retrieving temporal knowledge in the form of RDF triples without reification. Any resource in an RDF triple (subject predicate object) is converted into a temporal resource that includes a name and a time period components. Hence, a temporal RDF triple (temporal subject temporal predicate temporal object) is formed. The knowledge base system includes three tables for storing temporal triples: A triple Table, An Entity Table, and a Predicate Table. A temporal triple is stored in Subject, Temporal Predicate, and Object columns of the Triple Table and in the Temporal Entity column of the Entity Table. In various embodiments, an object relational, a relational, or NoSQL DBMS or a native RDF triple store system can implement the knowledge base.

16 Claims, 7 Drawing Sheets

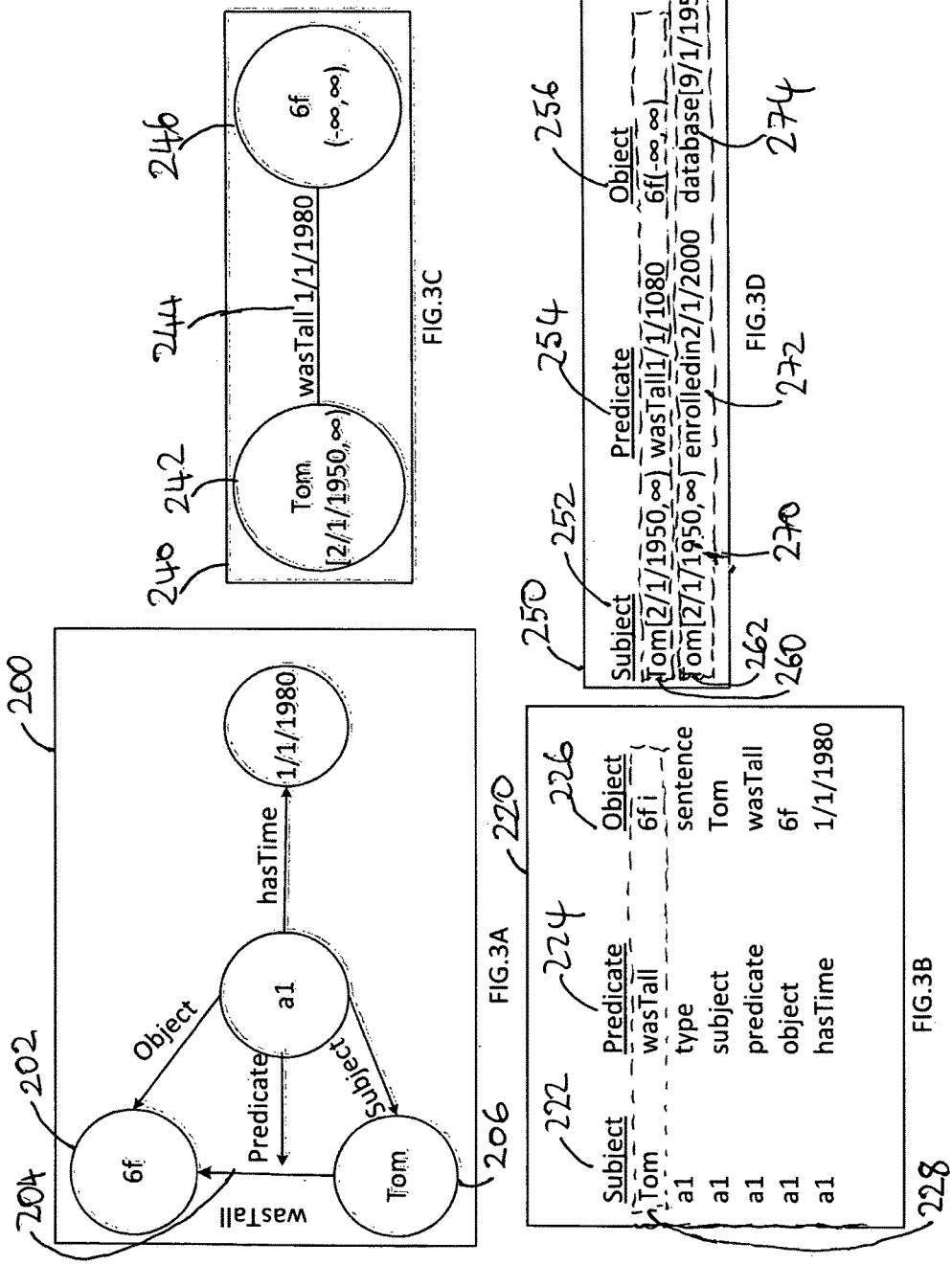

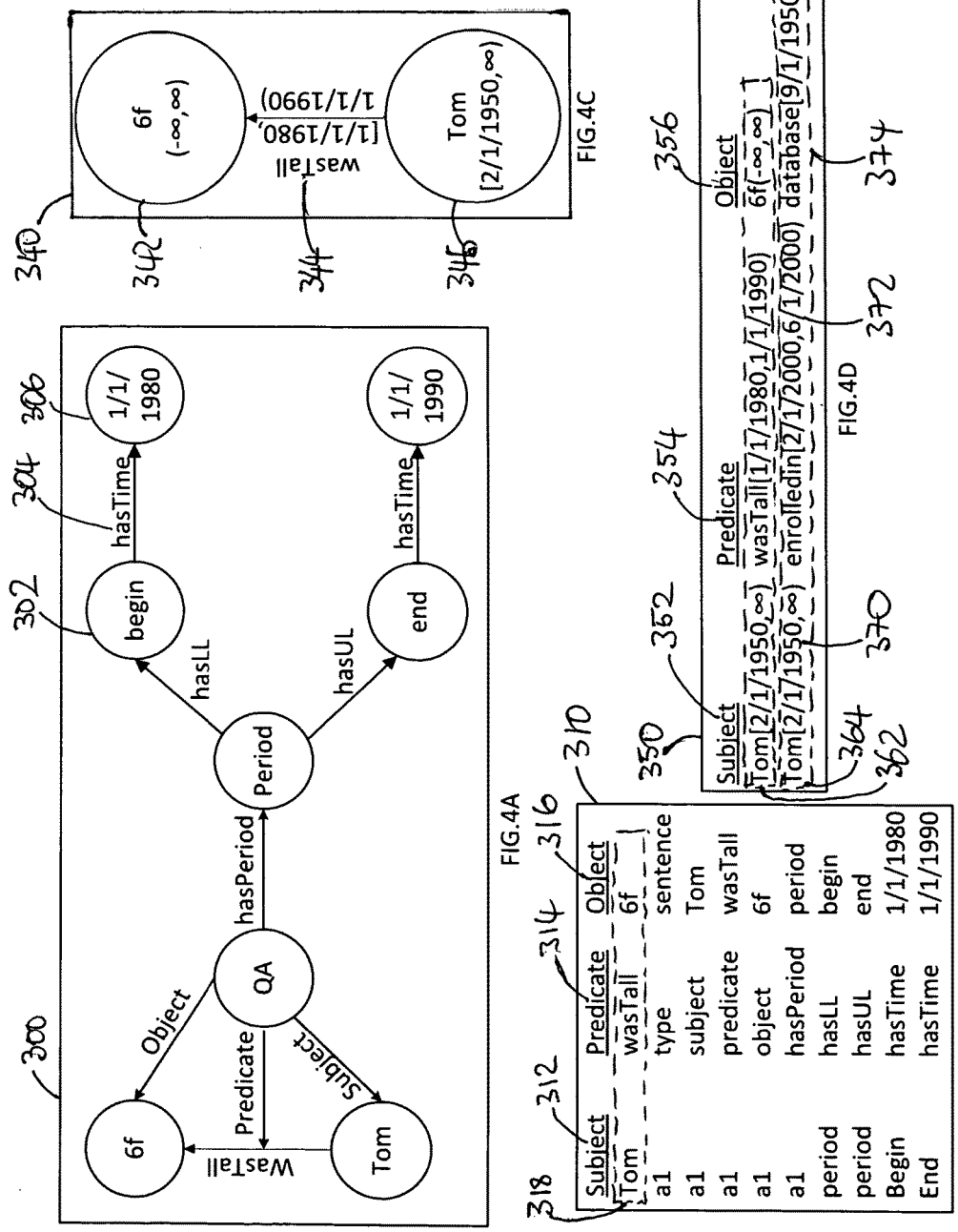

EFFICIENT MANAGEMENT OF TEMPORAL KNOWLEDGE

BACKGROUND

The exemplary embodiment relates to data management, particularly to a more efficient knowledge base system in managing temporal aspects of knowledge. Moreover, the exemplary embodiment may be incorporated to any other existing or future knowledge base systems.

Databases are large repositories that store data and use languages such as SQL to search for and retrieve stored data. Similarly, a knowledge base stores knowledge and provides languages such as SPARQL to retrieve the stored knowledge, along with OWL to infer implied knowledge from the stored knowledge. Relational, object relational or NoSQL DBMS or native data stores are used in storing the knowledge.

Two key aspects of temporal knowledge are valid time, and transaction time. Valid time is one aspect that shows when a fact (knowledge) is valid (true). In the fact "Tom was 6f tall at 1/1/1990" the valid time is 1/1/1990. While valid time shows when a fact is true, transaction time denotes the time a fact (knowledge) is recorded in the knowledge base. If the previous fact, "Tom was 6f tall at 1/1/1990" is recorded at 2/1/1990 the transaction time is 2/1/1990. A temporal knowledge may include either time or both. A knowledge base that includes only valid time is called Valid Time Knowledge Base (VTKB); while a knowledge base that includes only transaction time is called a Transaction Time Knowledge Base (TTKB). A Bitemporal Knowledge Base (BiKB) includes both valid and transaction times. Naturally other aspects of time can be defined.

Resource Definition Framework (RDF) and Resource Definition Framework Schema (RDFS) are the basis of current knowledge bases. OWL is also based on RDF. In these models the basic unit of knowledge is a triple (subject, predicate, object). A subject may be a concept (entity) and similarly an object may be another concept (entity) and the predicate represents a relationship between the object and the predicate. So, a triple is an assertion. Here are two sample assertions, a1 and a2. a1: <Tom isTall 6f> or a2: <Tom enrolledIn Database> where Tom is an entity; Database is another entity; 6f is a literal; and isTall and enrolledIn are predicates.

There are large knowledge bases, such as Yago, and DBpedia that contain millions of entities and billions of assertions. They store knowledge that has been automatically extracted from web based resources, such as WordNet and Wikipedia. On the other hand, Freebase relies on manually supplied knowledge. Such resources can help in many knowledge-related tasks such as answering questions by retrieving existing facts, or inferring implied facts.

A knowledge Base (KB) contains static knowledge and/or temporal knowledge. Static knowledge does not change over time, while temporal knowledge changes over time, and has multiple versions. Note that data and information are also primitive forms of knowledge.

Obviously assertions have a time reference and facts are valid at some point in time, perhaps currently. Consider assertions a1 and a2; typically, they are assumed to be true currently and an implicit (assumed) reference to their time is made. However, facts are true at a time instant or over a period of time. For representing the fact 'Tom was 6f tall at 1/1/1980' or 'Tom enrolled in database class at 2/1/2000' a typical RDF triple would not be sufficient since these sentences contain more than one predicate. In RDF a method called reification is used to represent assertions that involve more relationships. In reification, an RDF triple, such as (Tom wasTall 6f) is assigned a name, a1 and this name a1 is used in other RDF triples to specify the time. So five more triples are formed: (a1 type sentence), (a1 subject Tom), (a1 predicate wasTall), (a1 object 6f), (a1 hasTime 1/1/1980). So is the case for the temporal version of the assertion a2. FIG. 3A depicts the RDF graph for reified a1 and FIG. 3B lists the RDF triples required for representing that a1 was valid at 1/1//1980.

For representing the fact 'Tom was 6f tall from 1/1/1980 to 1/1/1990' or 'Tom enrolled in a database class from 2/1/2000 to 6/1/2000', a typical RDF triple would not be sufficient since these sentences contain more than one predicate. Again reification is needed. For the first assertion nine triples will be defined as seen in FIGS. 4A and 4B since a period has a beginning instant and an ending instant. The same is true for the second assertion above.

Obviously handling temporal knowledge with reification is a very expensive method. Any temporal fact would incur a fivefold or nine fold triple overhead. Because of this reason in systems like Yago and DBpedia shortcuts are used. Yago assign an id to each triple, and then adds two more triples with time predicates. In addition to a1, it includes (a1 occursSince 1/1/1980), (a1 occursUntil 1/1/1990). Naturally this type of reification is not complete and cannot completely capture temporal reality.

A system and a method are provided which can significantly improve the performance of knowledge bases in managing temporal facts in a VTKB or TTKB without using reification.

BRIEF DESCRIPTION

In accordance with one aspect of the exemplary embodiment, a temporal knowledge base system includes memory that stores a temporal knowledge base and a temporal knowledge base management system that includes instructions for adding triples (knowledge) to the knowledge base or querying the knowledge base. The knowledge base includes a Static Triple Store (STS) that contains the static knowledge not changing over time and a Temporal Triple Store (TTS) that contains temporal knowledge changing over time. Temporal knowledge is stored by an invented method explained herein instead of reification proposed in RDF specifications. The invented method is very efficient and different than the existing methods.

Accordingly, a method is provided for representing temporal knowledge in Resource Definition Framework (RDF), storing the RDF temporal knowledge in a Knowledge Base Management System (KBMS) that may utilize a Data Base Management System (DBMS), and retrieving the temporal knowledge stored in the KBMS. The method includes definition of the temporal resources that are used in forming temporal triples embodying the temporal knowledge, which are efficiently stored in and retrieved from a knowledge base.

In another aspect, the temporal knowledge base management system includes in-memory a knowledge base that may be implemented by a commercial DBMS, which may be relational, object relational, NoSQL or any other type of DBMS. The knowledge base includes a Static Triple Store (STS) and a Temporal Triple Store (TTS) that consists of an Entity Table including slots for its rows, one slot for each temporal subject or temporal object in a temporal triple, a Predicate Table including slots for its rows, one slot for each temporal predicate which is formed by a predicate and its lifespan, and a Triple Table including slots which, for each row of the Triple Table, respectively store a triple Id which is a serial number identifying a triple, the name of a temporal subject, a temporal predicate, and the Name of a temporal object of a respective temporal triple as a quadruple. The temporal subject and the temporal predicate, and the temporal object, respectively are composed of a first part that is its Name, a second part that is the beginning instant of a time period, and a third part that is the end instant of a time period, and the Name part of a row of the Entity Table and the subject in a row of the Triple table link these two tables, and the Name part of a row of Predicate Table and the Name part of a temporal predicate in the predicate column in a row of the Triple Table link these two tables. A processor executes the instructions.

In another aspect, a method for generating a temporal knowledge base management system includes in-memory a knowledge base that may be implemented by a commercial DBMS, which may be relational, object relational, NoSQL or any other type of DBMS. The knowledge base comprises an Entity Table, a Predicate Table, and a Triple Table. The Triple Table includes slots which, for each of a plurality of rows of the Triple Table, store a triple Id, the Name of a temporal subject, a temporal predicate, and the Name of a temporal object. The Entity Table stores temporal entities whereas the Predicate Table stores temporal predicates. Temporal entities and temporal predicates are made up of three parts: a Name value, a Begin value, and an End value. For a candidate temporal triple to be inserted into the KB If its predicate exists in the Predicate Table the time reference from the Predicate Table is retrieved and it is verified that the predicate's period is a subset of the retrieved period. If the predicate does not exist concatenating the predicate by the temporal predicate's period forms a temporal predicate and it is added it to the Predicate Table. If the subject exists in the Entity Table, its time reference is retrieved from the Entity Table and it is verified that the subject's period is a subset of the retrieved period. If the subject does not exist in the Entity Table the temporal subject is added to the Entity Table. If the temporal object, not a literal exists in the Entity Table its time reference retrieved from the Entity Table and it is verified that the object's period is a subset of the retrieved period. If the object does not exist in the Entity Table concatenating the object by its time period forms a temporal object and it is added to the Entity Table. If object is a literal its time reference defaults to $(-\infty, \infty)$. If the subject or the object exists in the Entity Table, the corresponding values in the Entity Table are adjusted with the time periods of the temporal subject and the temporal object. Finally, assigning the next serial value for id, the subject, the predicate concatenated by its period, and the object, forms a quadruple. The quadruple is inserted into the Triple Table.

In another aspect, knowledge base stored in non-transitory secondary memory includes a Static Triple Store and a Temporal Triple Store that is made up of three tables: An Entity Table, a Predicate Table, and a Triple Table. The Entity Table includes slots for its rows, one slot for each temporal subject or temporal object in a temporal triple. The Predicate Table includes slots for its rows, one slot for each temporal predicate that designate a predicate and its lifespan. The Triple Table includes slots which, for each row of the Triple Table, respectively store a triple Id which is a serial number identifying a triple, the name of a temporal subject, a temporal predicate, and the Name of a temporal object of a respective temporal triple as a quadruple. A temporal subject, a temporal predicate, and a temporal object, respectively are composed of a first part that is its Name, a second part that is the beginning instant of a time period, and a third part that is the end instant of a time period. The Name part of a row of the Entity Table and the subject in a row of the Triple table link these two tables, and the Name part of a row of the Predicate Table and the Name part of a temporal atom in the predicate column in a row of the Triple Table link these two tables.

BRIEF DESCRIPTION OF THE DRAWINGS

FIGS. 3A and 3B illustrate reification with time instants in RDF and FIGS. 3C and 3D show how instants are incorporated into triples without reification;

FIGS. 4A and 4B illustrate reification with time periods in RDF and FIGS. 4C and 4D show how periods are incorporated into triples without reification;

DETAILED DESCRIPTION

Figures 5, 5A, 5B, 6:
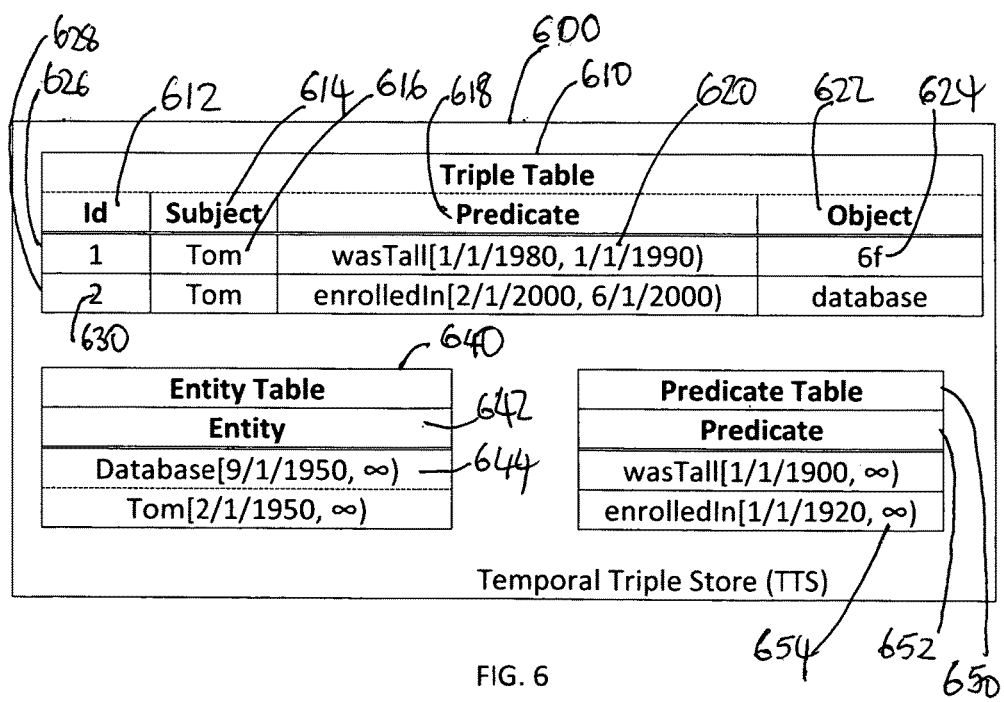
FIGS. 5A and 5B are schematic diagrams showing a temporal resource with a time instant and a temporal resource with a period, respectively.
FIG. 6 depicts an exemplary non-limiting RDF temporal data store design in tabular forms that are suitable for various embodiments of the present invention.

Aspects of the exemplary embodiment relate to a system and method for building an efficient knowledge base system. The knowledge base is backed by a KBMS, using a particular method for storing temporal knowledge without reification. Analysis provided in Background section, supported by FIGS. 4 and 5, shows that the exemplary system outperforms existing systems in performance of both loading and querying and in data compactness and storage.

Every entity or concept (thing) changes over time or stays the same. Let e be an object (thing) without any temporality, denote e's temporal version by ε. The invention represents ε as a complex type with two components, <e,t> where t is a temporal reference for e. The time reference, 't' can be a time instant or a period. The notations ε.v and ε.T to represent these two components, i.e. ε.v=e and ε.T=t. ε asserts that entity e exists over the time t or recorded at time t.

Consider the two examples mentioned in the Background Section: a1: <Tom wasTall 6f> or a2: <Tom enrolledIn Database> are static knowledge. Assume Tom exists 2/1/1950 and onwards and the database course was first offered on 9/1/1950 and continues ever since then. The fact 'Tom was 6f tall at 1/1/1980' or 'Tom enrolled in database class at 2/1/2000' are represented in the exemplary embodiment as (Tom[2/1/1950, ∞) wasTall1/1/1980 6f(-∞, ∞)) and (Tom [2/1/1950, ∞) enrolledIn2/2/200 database(9/1/1950, ∞)), respectively. Similarly, for representing the fact 'Tom was 6f tall from 1/1/1980 to 1/1/1990' or 'Tom enrolled in a database class from 2/1/2000, 6/1/2000' time periods need to be used. So, the triple for the first fact is (Tom[2/1/1950, ∞)

wasTall(1/1/1980, 1/1/1990) 6f(-∞, ∞)) and the triple for the second fact is (Tom[2/1/1950, ∞) enrolledIn[2/1/2000, 6/1/2000) Database[9/1/1950, ∞)). A time instant is equivalent to a period where its beginning and its ending instants are the same. So, the instant 1/1/1980 is the same as the period [1/1/1980, 1/1/1980]. In the embodiment of the invention instants are replaced by an equivalent period without loss of generality or expressive power.

The time reference of an assertion, say a1 is calculated as the intersection of the time references of its components and the assertion holds during this period. In other words a1.T=Tom.T∩n wasTall.T∩6f.T and wasTall.T ⊆Tom.T∩6f.T. Moreover, two temporal triples may not have overlapping periods if their static triples without any time are the same. In other words for a first temporal triple (s1 p1 o1) and a second temporal triple (s2 p2 o2) periods of s1 and s2, periods of p1 and p2, or periods of o1 and o2 may not overlap if the Name parts of s1 and s2, p1 and p2, and o1 and o2 are the same.

1. Terminology

Before presenting the details of the exemplary system, several terms and concepts used are first defined:
   a. We use the standard RDF definitions, such as resource, subject, predicate, object, triple, and reification as provided by W3C (http://www.w3.org/RDF/).
   b. A knowledge Base (KB) contains a Static Knowledge (SK) part and/or a Temporal Knowledge (TK) part. A KB may store these two parts separately as a Static Triple Store (STS) and a Temporal Triple Store (TTS) or store them as one single triple store. In the present invention they are separated for the ease of the presentation.
   c. A typical non-reified RDF triple (subject predicate object) represents static knowledge.
   d. A RDF triple (x y z) represents a temporal knowledge where x is a temporal entity (concept), y is a temporal predicate, and z is a temporal entity or a temporal literal (string or number). The notation (x y z) denotes a temporal triple.
   e. A temporal entity, a temporal predicate, a temporal subject, a temporal object, and a temporal literal are collectively called as a temporal resource.
   f. For a temporal entity and a temporal predicate its period may be the lifespan of the temporal entity or the temporal predicate indicating their period of existence.
   g. A temporal resource has two components: a resource name and a time reference as depicted in FIG. 5. Time reference may be a time instant or a period. In a string that represents a temporal resource a delimiter may separate the name and the period.
   h. The symbol -∞ is the smallest time instant and ∞ is the largest time instant.
   i. A period is in the form of [Begin, End] where 'Begin' is the lower limit and 'End' is the upper limit. The period includes all the time instants between 'Begin' and "End'. The symbols [ or ] indicate that the ending instants are included and they can be replaced by ( or ) to indicate the ending instants are not included.
   j. The default time period of a temporal literal is (-∞, ∞).
   k. The default time period of a resource that does not change over time is (-∞, ∞).

2. Exemplary System

Figure 1:
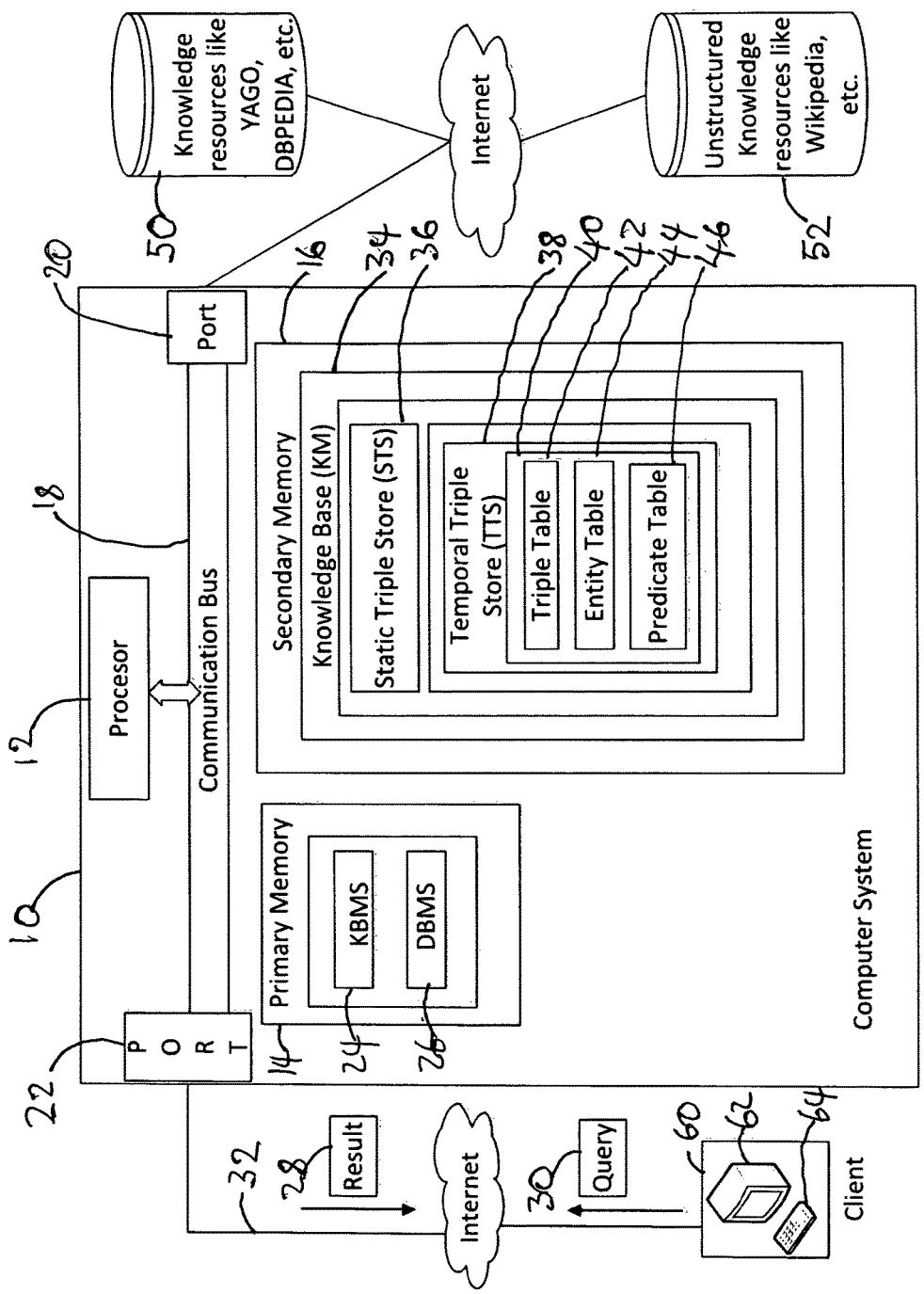
FIG. 1 is an overview of an exemplary computing system suitable for incorporation of one aspect of the exemplary embodiment of the present invention.

FIG. 1 illustrates an exemplary temporal knowledge base system 10, which stores temporal triples, and regular triples and provides access to these triples. The system includes primary memory 14 that stores instructions 24 for implementing the exemplary methods and a processor 12, in communication 18 with the memory, which implements the instructions. Primary memory 14 stores a KBMS 24 that handles the knowledge base with a DBMS 26. Secondary memory 16 stores a knowledge base 34 that includes a Static Triple Store (STS) 36 and a Temporal Triple Store (TTS) 38 that in turn includes three tables 40, for storing temporal knowledge: a Temporal Triple Table 42, an Entity Table 44, and a Predicate Table 46 and may also have supporting tables for query and storage optimization. The Temporal Triple Table 42 contains at least 3 columns (preferably augmented by an additional Id column that is a serial number for the temporal triples) and each row stores a temporal triple. The Entity Table 44 and the Predicate Table 46, each has at least one column for storing the temporal entities and temporal predicates, respectively.

A client 60 is connected, wired or wireless, to the system 10 via Internet or a LAN 32 that connects to a port 20, 22 of the system 10. The client is any type of computing device that has an output component such as a screen 62 and an input device such as a keyboard 64. The user of a client 60 submits a query in a suitable language such as SPARQL to be understood by the KBMS 26 to the system 10 which in turn process it and returns one or more results 28.

System 10 is connected to a knowledge source directly or through Internet or a LAN. The connection may be wired or wireless. The knowledge source can be structured 50 like Yago or unstructured 52 like Wikipedia. Alternatively or additionally, the system 10 may use appropriate algorithms for extracting knowledge from resources such as Wikipedia, or Freebase etc. 50, 52.

The system memory 14 stores a knowledge base management system (KBMS) 24, for the creation of tables 40, 42, 44, 46 from the knowledge sources 50, 52 and for accessing the knowledge stored therein. The KBMS can be supported by a DBMS that can be relational, object relational, NoSQL, or any other DBMS suitable for RDF stores.

The system 10 has ports 20, 22 for communicating with external devices 32, 50, 52 and its hardware components 12, 14, 16 may communicate via a system bus 18.

As will be appreciated, the STS could be implemented by any commercial DBMS or native triple store like Jena, etc. The non-limiting realization of the TTS in various embodiments of the present invention is the subject of this patent application. Three alternative realization methods are provided as examples and various other alternatives can also be conceived. Note that in the remainder of this report the first alternative based on an object relational DBMS that supports composite data types is used.

Temporal Triple Store (TTS) 38 can be implemented in an object relational DBMS that includes three tables 40, for storing temporal knowledge: a Temporal Triple Table 42, an Entity Table 44, and a Predicate Table 46 as illustrated in FIG. 5. The Temporal Triple Table has 4 columns:
   1. ID, numeric
   2. Subject, character
   3. Predicate, temporal predicate
   4. Object, character or numeric As it is clear, an object may be an entity or a literal. In adding a temporal triple to the TTS, if the object is a literal RDF requires that it be specified with its data type otherwise the object is an entity. However, in case of retrieval from TTS the object is a literal if it does not exist in the Entity Table. The type of the object can be stored in an additional column to further improve the efficiency of the retrieval. This is not further explained in the current embodiment; however, it can easily be added to the present invention.

The Entity table has one column only:
1. Entity, temporal entity

The Predicate Table has one column only:
1. Predicate, temporal predicate

In another embodiment of the exemplary TTS, a relational DBMS could be used in realizing the TTS by defining three tables, an Entity Table, a Predicate Table, and a Temporal Triple Table that has 6 columns:
1. ID, numeric
2. Subject, character
3. Predicate, character
4. Predicate's Begin, timestamp
5. Predicate's End, timestamp
6. Object, character The Entity Table has three columns:
1. Entity, character
2. Entity's Begin, timestamp
1. Entity's End timestamp The Predicate Table has three columns:
1. Predicate, character
2. Predicate's Begin, timestamp
3. Predicate's End timestamp In still another embodiment of the exemplary TTS a NoSQL DBMS could be used in realizing the TTS that includes three JSON documents: an entity document, a predicate document, and a temporal triple document. Temporal triple document is defined as:
Document
    {"ID": number,
        "Subject": string,
        "Predicate": {
            "Name": string,
            "Begin": datetime,
            "End": datetime }
        "Object": string }

The entity document is defined as:
Document {
    "Entity": {
        "Name": string,
        "Begin": datetaime,
        "End": datetime, }

The predicate document can be defined as:
Document {
    "Predicate": {
        "Name": string,
        "Begin": datetaime,
        "End": datetime, }

For performing the exemplary method, the system 10 may comprise one or more computing devices, such as a server computer, a desktop, a laptop, palmtop computer, tablet computer, portable digital assistant (PDA), cellular telephone, pager, or a combination thereof, or other computing device(s) capable of executing instructions.

The secondary memory 16 may represent any type of non-transitory computer readable medium such as random access memory (RAM), read only memory (ROM), magnetic disk or tape, optical disk, flash memory, sun of flash memory or holographic memory. In one embodiment, the memory 14, 16 comprises a combination of random access memory and read only memory. In some embodiments, the processor 12 and memory 14 and/or 16 may be combined in a single chip. The network interface 20, 22 allows the computer to communicate with other devices via a computer network, such as a local area network (LAN) or wide area network (WAN), or the Internet, and may comprise a MODEM.

Figure 2:
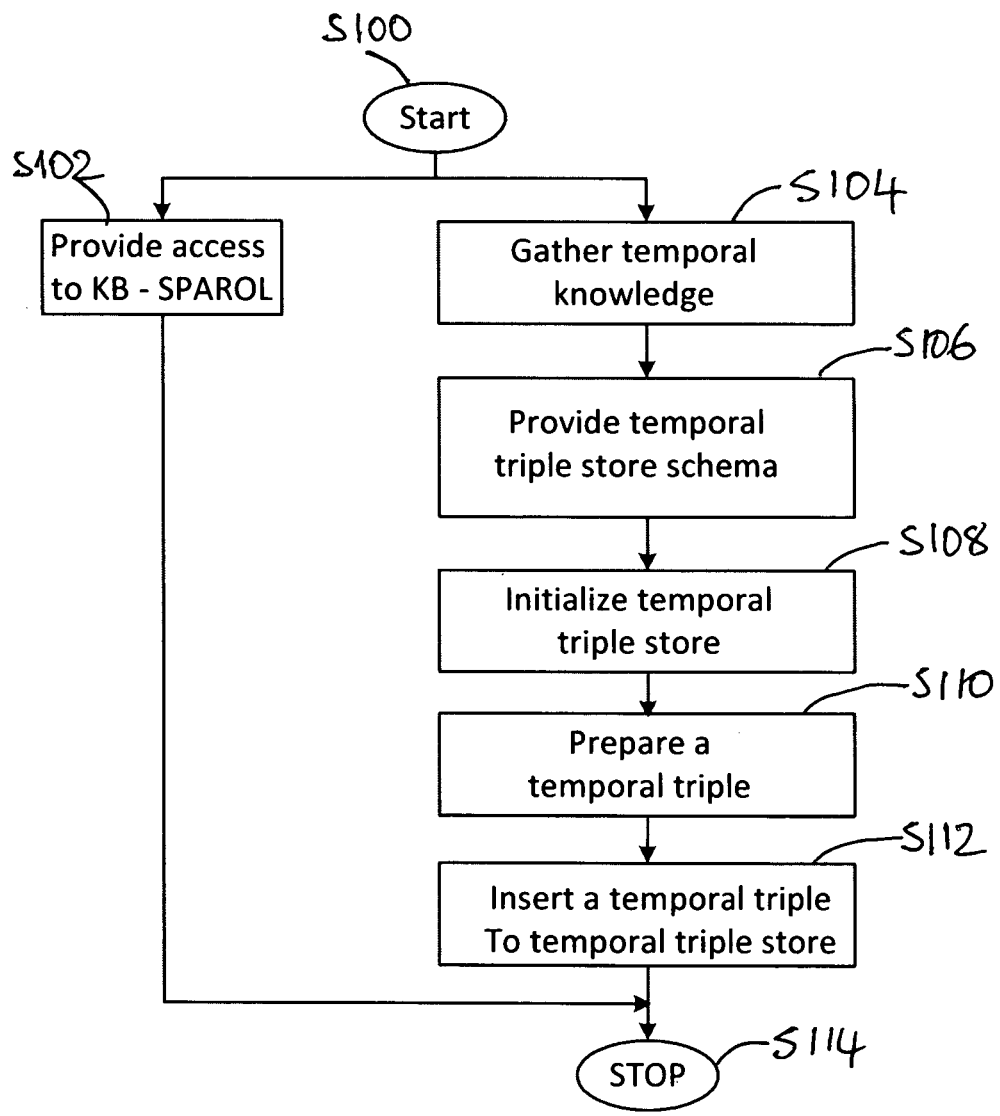
FIG. 2 is a non-limiting functional flow diagram illustrating a method for creation of a knowledge base in accordance with another aspect of the exemplary embodiments.
Figure 7:
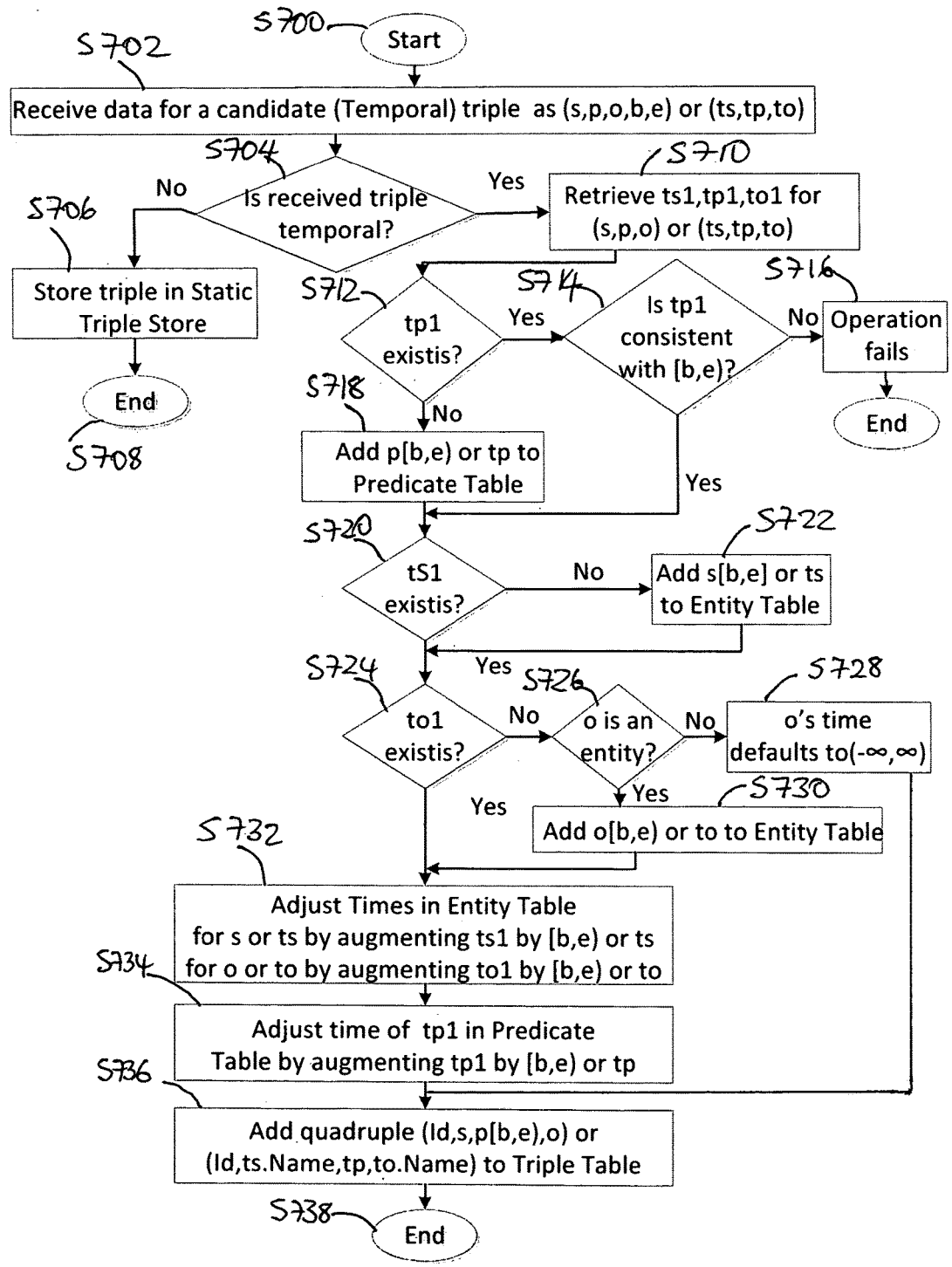
FIG. 7 is a non-limiting flow diagram for adding a temporal triple to the knowledge base created by the Method in FIG. 2.
Figure 8:
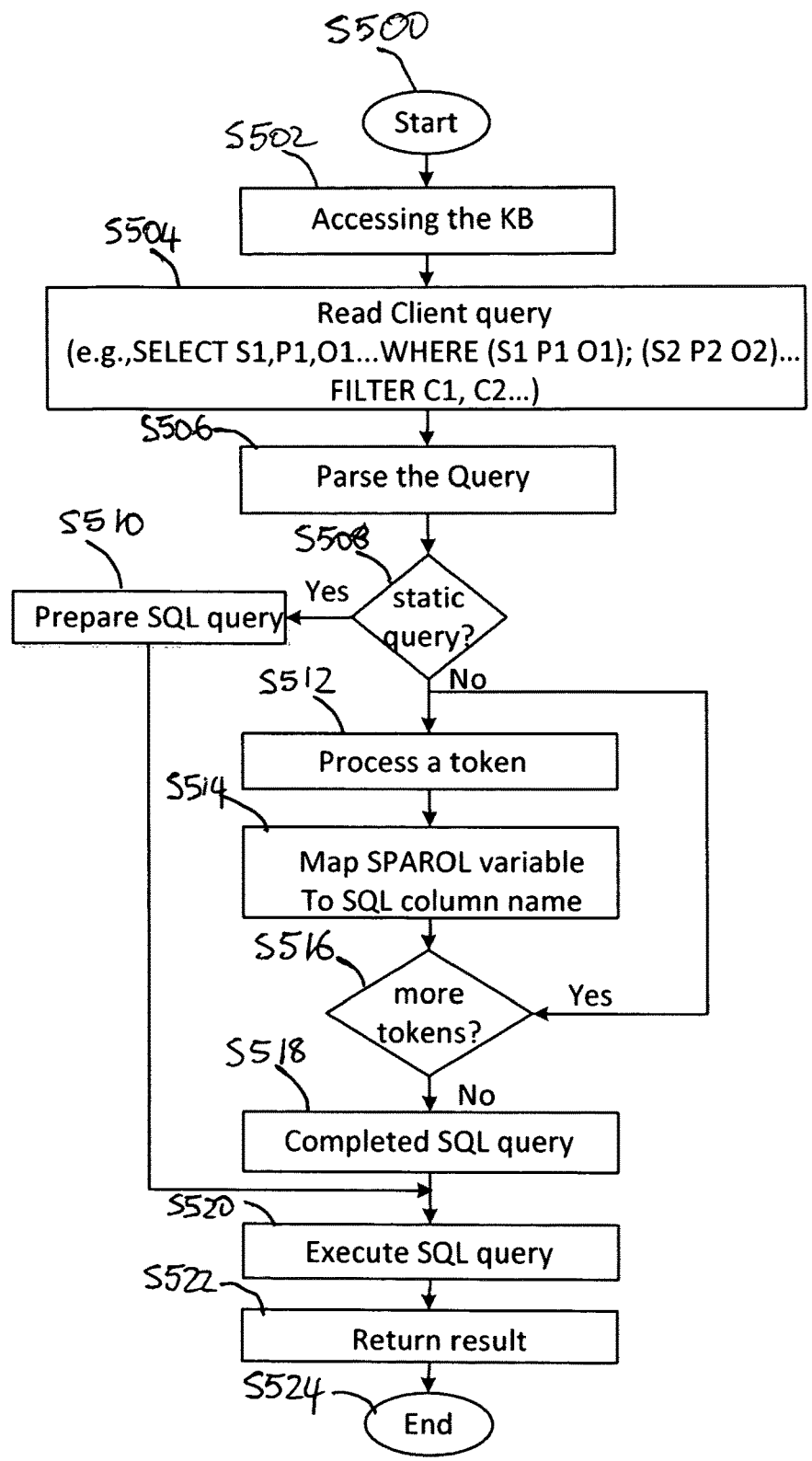
FIG. 8 is a non-limiting flow diagram that converts a SPARQL query to a SQL query and queries the knowledge base in FIG. 1.

The digital processor 12, in addition to controlling the operation of the system 10, executes instructions stored in memory 14 performing the method outlined in one or more of FIGS. 2, 7, and 8.

The client device 60 may be similarly equipped with memory and a processor, as well as one or more user input devices 64, such as a keyboard, touch screen, cursor control device, for inputting queries, and a display screen 62, or other output device, for outputting the response 28 in human-recognizable form or machine readable form. In the exemplary embodiment, a server 10 and client device 60 are illustrated. However, it is to be appreciated that the client device 60 may alternatively host the system 10. In some embodiments, the system 10 may be distributed over two or more computing devices.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a non-limiting high-level functional block diagram of only a portion of the components which are incorporated into a computer system 10. Since the configuration and operation of programmable computers are well known, they will not be described further.

3. Exemplary Method for Creation of the Knowledge Base 34

FIG. 2 illustrates an exemplary method for creation and use of a knowledge base 34 and the system depicted in FIG. 1 can perform it.

The method starts at S100.

At S102 access to knowledge base is provided to answer a user/client query expressed in a language like SPARQL, which is further explained in FIG. 8.

At S104, access to knowledge resources 50, 52 or other source of information is provided for gathering temporal knowledge that will be stored in the knowledge base 34.

At S106, Temporal Triple Store 38 schema for the knowledge base 34 is defined. The Temporal Triple Store 38 schema defines the tables 40 for a relational database or the document types for a NoSQL database as further explained in Section 4.

At S108, the Temporal Triple Store tables 40 are created and initialized, which initially may be empty.

At S110 a temporal triple is prepared from the temporal knowledge acquired from a knowledge source 50, 52 or other sources of knowledge. Concatenating the resource name with the time reference acquired forms a temporal resource. Once the three resources of a prospective RDF triple are prepared, a temporal triple is formed for which a unique Id is assigned.

At S112 the temporal triple prepared in the earlier step is added to the TTS and this step is repeated for each additional temporal triple prepared.

At S114 the method terminates.

3.1 Temporal Knowledge without Reification

FIGS. 3A and 3B depict triples that are reified by a time instant. A triple is represented by a graph 200 that includes resources as circles 202, 206 that are connected by predicates depicted as arrows 204. The graph 200 also has other triples that reify the original triple by a time instant, 2/1/1980. Alternatively, triples 226 may be listed in tabular form 220 where each row 226 a triple and formed from a subject 222, a predicate 224, and an object 226. There are 6 such triples.

Similarly, FIGS. 4A and 4B depict triples that are reified by a period that is designated by a beginning instant, Begin and an ending instant End. The circles 302, 306 and arrows 304 are resources in a graph 300 and are used in forming triples. The triple (Tom wasTall 6f) is reified by the period [1/1/1980, 1/1/1990). FIG. 4B depicts the graph 300 in tabular form 310. Each row 318 represents a triple formed by a subject 312, a predicate 314, and an object 316. There are 10 such triples.

FIG. 5 is a schematic representation of the temporal resources. FIG. 5A depicts a temporal resource 400; it has two parts, a resource name 402 and a time instant 404. It asserts that the resource has the instant as its time reference meaning that it is valid at or recorded at that instant and may even be valid onwards. wasTall1/1/1980 and enrolledIn2/1/2000 are examples of temporal resources. FIG. 5B depicts a temporal resource 410 with a time period 416 that has a beginning instant, Begin 418 and an ending instant, End 420. The temporal resource has a name 414. Similarly, a temporal resource with a period 410 asserts that it is valid or recorded during the period 416. Examples of the temporal resources with time periods are Tom[2/1/1950, ∞), enrolledIn[2/1/2000, 6/1/2000) and Database[9/1/1950, ∞).

A temporal resource may be a temporal subject, a temporal predicate or a temporal object in a temporal triple and any combination of time instants or periods can appear in a temporal triple. However, not all the combinations are meaningful; the meaningful combinations are:

a. All resources in a temporal triple are time instants. If the same time instant appears as the subject, predicate and object of the triple, clearly it is repetitious and time instant needs to be stored only once. It can simply be implemented in any DBMS. However, in case the subject, the predicate, and the object in a triple have different time instants, respectively the triple is meaningful and the time reference of each resource defaults to a period whose beginning is the resource's time instant and its ending is also that instant or infinity.

b. The case of a temporal subject and a temporal object has time periods and the temporal predicate is a time instant is interesting and is used in modeling events that occur at an instant.

c. The case of all the resources are with periods in a temporal triple is the most interesting and a general one and explained in detail in the present invention. Note that combinations (a) and (b) are a special case since a time instant is equivalent to a time period where the Begin and End are the same as that time instant.

FIGS. 3 and 4 illustrate how resources are used in forming temporal knowledge with reification as required by the RDF specification and without reification that is the subject of present invention. FIGS. 3A and 3B use reification whereas FIGS. 3C and 3D represent the same knowledge without reification. FIG. 3C is a temporal RDF graph 240 made up of temporal resources 242, 244, 246: a temporal subject 242 whose time reference is a period, a temporal predicate 244 whose time reference is an instant, and a temporal object that is a literal 246. FIG. 3D serializes the graph 240 into tabular form 250, which has subject 252, predicate 254, and object 256 columns whose values are temporal resources 270, 272, 274. For the convenience of the user, predicates with time instants are allowed; time instants are stored as periods in the knowledgebase for the ease of implementation in the remainder of present invention. In other words, wasTall1/1/1980 is stored as wasTall[1/1/1980, 1/1/1980] or wasTall[1/1/1980, 1/2/1980) in the knowledge base. The first row 260 is a temporal triple for the graph 240. The second row 262 in FIG. 3D is an additional temporal triple to better illustrate the invented method, which is not show in other parts of FIG. 3. Note that times of the subject and the object are included in FIGS. 3C and 3D whereas they are not included in FIGS. 3A and 3B for the sake of brevity.

FIGS. 4A and 4B use reification whereas FIGS. 4C and 4D represent the same knowledge without reification. FIG. 4C is a temporal RDF graph 340 made up of temporal resources 342, 344, 346: a temporal subject 342, a temporal predicate 344, and a temporal object 346; their time reference is a period. FIG. 4D serializes the graph 340 into tabular form 350, which has subject 352, predicate 354, and object 356 columns whose values are all temporal resources 370, 372, 374. The first row 362 is a temporal triple for the graph 340. The second row 364 in FIG. 4D is an additional temporal triple to better illustrate the invented method, which is not show in other parts of FIG. 4. Note that times of the subject and the object are included in FIGS. 4C and 4D whereas they are not included in FIGS. 4A and 4B for the sake of brevity.

Temporal triples are retrieved from the knowledge sources 50, 52. For the triple (a b c), for instance YAGO has two more triples triple (k occursSince t1) and (k occursUntil t2) where k is the YAGO Id of triple (a b c) and t1 and t2 are timestamps. In preparing a candidate triple for insertion into the KB 36, period [t1, t2) is concatenated to b to form a temporal resource b[t1, t2). Temporal resources for a and c, respectively a[t3, t4) and c[t5, t6) may exist in the knowledge base or are obtained from other YAGO triples or from other sources. Determining the time references in a[t3, t4) and c[t5, t6), respectively may be done automatically by a machine and/or manually. This may be a time consuming and expensive process since temporal knowledge evolves over time and/or temporal knowledge may be incomplete when it is captured for storing in the knowledge base 34. Furthermore, time references of a and c that are stored in a knowledge base may not be the same as obtained from knowledge sources at this step. If this is the case, they need to be reconciled to reflect the true state of the knowledge and they replace the ones stored in the knowledge base.

3.2 Tables in Temporal Triple Store

FIG. 6 is a schematic of the tables 600 in the Temporal Triple Store of FIG. 1 that depicts a non-limiting exemplary embodiment. There are three tables: a Triple Table 610, an Entity Table 640, and a Predicate Table 650. The Triple Table 610 has four columns: an Id column 612 that is a serial number for a temporal triple, a subject, 614 a predicate 618 and object columns 622 and each row stores a temporal triple 626, 628. The subject column 614 stores the name part 616 of a temporal entity that is the subject 614; it is Tom 616 for the first row 626. The Predicate column 618 stores temporal predicates 620. An example in the first row 626 is wasTall[1/1/1980, 1/1/1990) 620. The Object column 622 stores either the name part of a temporal entity 624 or a literal 624. The time reference of any literal defaults to (−∞, ∞) and is not stored in the table.

The Entity Table 640 has only one column named Entity 642 whose values are temporal entities 644. No two temporal entities in the Entity Table may have overlapping periods if they have the same name parts. The Predicate Table 650 has only one column 652 for storing the temporal predicates 654 and their lifespans. For instance, the predicate wasTall is being used since 1/1/1900. No two temporal predicates in the Predicate Table may have overlapping periods if they have the same name parts.

4. Defining Temporal Triple Store Schema

The schema of the Temporal Triple Store 38 is described in a formal language, such as SQL, or a variant thereof, supported by the database management system 26 or a RDF native triple store. The exemplary relational schema includes three tables 40 which are defined in PostgresSQL which is an open source object relational DBMS in the following paragraphs. Temporal triples are stored in each row of the tables 40.

4.1. Temporal Triple Store in an Object Relational DBMS 4.1.1 Triple Table

Triple Table 610 has four columns and it may be augmented with additional columns for adding additional functionality to the system 10. The first SQL statement below creates a complex data type, named Temporal Resource that is further used in defining the columns of the Triple Table. The second SQL statement creates the Triple Table. The Id column is a 64-bit (or less) integer large enough to accommodate a very large number of triples. The next three SQL statements define multi-column indexes for faster retrieval of triples based on a subject, a predicate, or an object, respectively or by any combination thereof.

CREATE TYPE TemporalResource AS (
　Name VARCHAR,
　Begin TIMESTAMP,
　End TIMESTAMP );
CREATE TABLE TripleTable (
　Id BIGNT PRIMARY KEY,
　Subject VARCHAR,
　Predicate TemporalResource,
　Object VARCHAR );
CREATE INDEX SPOindex ON TripleTable (Subject.Name, Predicate.Name, Object.Name);
CREATE INDEX PSOindex ON TripleTable (Predicate.Name, Subject.Name, Object.Name);
CREATE INDEX OPSindex ON TripleTable (Object.Name, Predicate.Name, Subject.Name);

The Id column identifies each triple and is used in reification for non-binary relationships, indexing or in other optimization methods. Moreover, indexes on time may also be defined:
CREATE INDEX TIMEIndex ON TripleTable GIST (PERIOD(Begin, End);

4.1.2 Entity Table

The Entity Table has just one column 640. Following SQL statement creates it by using the temporal resource defined above.
CREATE TABLE EntityTable (
　Entity TemporalResource,
　PRIMARY KEY Entity.Name )

4.1.3 Predicate Table

The Predicate Table has just one column 650. Following SQL statement creates it by using the temporal resource defined above.
CREATE TABLE PredicateTable (
　Predicate TemporalResource,
　PRIMARY KEY Predicate.Name )

A new version of postgresSQL supports temporal VARCHAR as a native data type instead of defining a complex type. Temporal VARCHAR data type contains a string, which is made up of a resource name along the time period of this resource as just one string, thus directly implementing a temporal resource. In the above definition of TripleTable replacing the Temporal Resource data type by VT_VARCHAR would suffice for this purpose and the resource Name, Begin, and End can be reached by the functions supplied in postgresSQL.

It is to be appreciated that using other types of DBMS such as a relational or a NoSQL DBMS or a native triple store that stores and retrieves RDF triples may also embody the Temporal Triple Store. What follows illustrate additional embodiments of the temporal triple store by a relational DBMS and by a NoSQL DBMS.

4.2. Temporal Triple Store in a Relational DBMS 4.2.1 Triple Table

The Triple Table 610 can be embodied by a 6 column table ima relational DBMS. The first one is an Id that is unique for each row and it can be assigned sequentially as each triple is added. The second column is for the name part of a temporal subject. The next three columns are for the temporal predicate and the last column is for the name part of a temporal object. The Id column identifies each triple and is used in reification, indexing and in other optimization methods.

The following PostgresSQL commands can be used to create the Triple Table and its indexes accordingly:
CREATE TABLE TripleTable (ID BIGNT PRIMARY KEY,
　Subject VARCHAR,
　Predicate VARCHAR,
　PBegin TIMESTAMP,
　PEnd TIMESTAMP,
　Object VARCHAR
　);
CREATE INDEX SPOindex ON TripleTable (Subject, Predicate, Object);
CREATE INDEX PSOindex ON TripleTable (Predicate, Subject, Object);
CREATE INDEX OPSindex ON TripleTable (Object, Predicate, Subject);

The first commend creates the TripleTable and the next three commends creates three indexes SPOIndex, PSOIndex, and OPSIndex on the Triple Table for faster access on subject, predicate, and object resources, respectively or by any combination thereof.

4.2.2 Entity Table

The Entity Table has just three columns 640. Following SQL statement creates it by using a separate column for each part of a temporal entity.
CREATE TABLE EntityTable (
　Entity VARCHAR,
　EBegin TIMESTAMP,
　EEnd TIMESTAMP );

4.2.3 Predicate Table

The Predicate Table has just three columns 650. Following SQL statement creates it by using a separate column for each part of a temporal predicate.
CREATE TABLE PredicateTable (
　Predicate VARCHAR,
　PBegin TIMESTAMP,
　PEnd TIMESTAMP )

4.3 Temporal Triple Store in a Couchbase NoSQL DBMS

The following Couchbase statements can be used to create the Triple Table 610 and its indexes accordingly. Note that Couchbase supports JSON documents:

4.3.1 Triple Table

Following JSON document defines the Triple Table 610 in a Couchbase DBMS:

Document: Quadruple
{"ID": number
   "Subject": string,
   "Predicate": {
      "Name": string,
      "Begin": datetime,
      "End": datetime, }
   "Object": string }

The following functions create indexes in Couchbase for faster retrieval of the triples based on subject, predicate, and object, respectively:

SPOIndex:
function(TripleStore, meta)
{
   Emit(Triplestore.Subject, [TripleStore.predicate,Triplestore.object]);
}
PSOIndex:
function(TripleStore, meta)
{
   Emit(TripleStore.predicate, [Triplestore.Subject, Triplestore.object]);
}
OPSIndex:
function(TripleStore, meta)
{
   Emit(Triplestore.object, [TripleStore.predicate, Triplestore.Subject]);
}

4.3.2 Entity Table

Following JSON document defines the Entity Table 640 in a Couchbase DBMS.

Document: EntityDoc
   {"Entity": {
      "Name": string,
      "Begin": datetaime,
      "End": datetime, }}

4.3.3 Predicate Table

Following JSON document defines the Predicate Table 650 in a Couchbase DBMS.

Document: PredicateDoc
   {"Predicate": {
      "Name": string,
      "Begin": datetime,
      "End": datetime, }}

The KB 34 in general and the Temporal Triple Store 38 in particular is populated by adding triples (S700 in FIG. 7) using knowledge sources 50, 52 or the knowledge provided by experts. Adding temporal triples to Temporal Triple Store is illustrated in FIG. 7 as follows:

5. Populating the KB (S700)

The KB is created and populated according to the alternative definitions provided in the previous section 4. A method for the population of the KB embodied by an object relational DBMS is explained below. For the other implementation methods changes needed are also provided. Adding a temporal triple can be performed as illustrated in FIG. 7.

5.1. Populating the KB in an Object Relational DBMS

At S702 data (s, p, o, b, e) for a candidate triple is received where [b, e) is the time reference of the predicate p in the triple (s p o). Additionally the time references for the subject and/or the object for the candidate triple may also be a part of the input data, i.e. s and o are temporal resources. In other words a temporal triple, (ts tp to), (ts tp o), or (t tp to) is the input data.

At Step S704 the candidate triple, say (s p o) is checked to be static or temporal. If it is static it is passed to Step S706; if it is temporal it is passed to S710.

At S706 the static triple is added to Static Triple Store and the method terminates at S708.

At S710 temporal resources for the triple (s p o) is retrieved from the KB, say they are (ts1 tp1 to1). Temporal resources ts1 and to1 are retrieved from the Entity Table if any one of them exists in that table and sp1 is retrieved from the Predicate Table if it exists in that table. Let the time reference of ts1, tp1, and to1 be [b1, e1), [b2, e2), and [b3, e3), respectively.

Step S712 checks if tp1 is in the Predicate Table. If tp1 exists, at S714 it is verified that tp1's time [b2, e2) is not consistent with [b, e) or the period of tp then the operation fails at S716. In case tp1 does not exist in the Predicate Table a new temporal predicate, p[b, e) or tp is added to the Predicate Table at S718. This is accomplished by moving p to Predicate.Name, b to Predicate.Start, and e to Predicate.End and by issuing an SQL INSERT statement with Predicate or tp as its argument.

At S720, in case ts1 does not exist in the Entity Table a new temporal entity, s[b, e) or ts is added to the Entity Table at S722. This is accomplished by moving s to Entity.Name, b to Entity.Start, and e to Entity.End and by issuing an SQL INSERT statement with Entity or ts being its argument.

At S724 it is checked whether to1 exists in the Entity Table. In case to1 does not exist in the Entity Table, o or to is checked to be a literal or an entity at S726. In case it is a literal its time reference at S726 defaults to the period (−∞, ∞), which is used in computations whenever needed and it is not stored in the knowledge base. If o or to is an entity a new temporal entity o[b, e) or to is added to the Entity Table at S730. This is accomplished by moving o to Entity.Name, b to Entity.Start, and e to Entity.End and by issuing an SQL INSERT statement with Entity or to being its argument.

At S732 both ts1 and to1 exist in the KB; the time reference of the corresponding entries in the Entity Table for ts1 and to1 are adjusted by augmenting the stored time references [b1, e1) and [b3, e3), respectively by the period [b, e), or the period of ts or to. An SQL UPDATE statement is issued to incorporate the adjusted time into the Entity Table.

At S734 the time reference of tp1 in the Predicate Table, [b2, e2) is adjusted by augmenting it by the period [b, e) or by the period of tp. An SQL UPDATE statement accomplishes this.

Finally at step S736 the next serial value is assigned to Id and one of the quadruples (Id s p[b, e) o) or (Id ts.Name tp to.Nmae) is added to the Triple Table by an SQL INSERT statement and it completes the processing of the temporal triple received at step 702.

At step S738 the method terminates.

S700 through S738 are repeatedly invoked to add more candidate temporal triples to the TTS during its creation and its maintenance later.

5.2 Populating the KB in a Relational DBMS

The KB 34 that is implemented by a relational DBMS is populated by following a modified version of the method described in steps S700-S738 in FIG. 7 for adding triples extracted from knowledge sources 50, 52. These modifications are: In Section 5.1 any move operation in the form of "move x to Predicate.Name", or "move y to Entity.Name", is changed to "move x to Predicate", or "move y to Entity', respectively. Similarly, any move operation that involves b1, e1, b2, e2, b3, or e3 is changed to "move b1 to SBegin", "move e1 to SEnd", "move s2 to PBegin", "move e2 to PEnd", "move e3 to EBegin", or "move e3 to EEnd". The arguments of the INSERT statements in S720, S724, and S736 and the UPDATE statements in S732 and S734 are accordingly changed. The method of FIG. 7, modified as explained above would populate the KB implemented by a relational DBMS.

5.3 Populating the KB in NoSQL DBMS

The KB 34 that is implemented by a Couchbase NoSQL DBMS is populated by following a modified version of the method described in steps S700-S738 in FIG. 7 for adding triples extracted from knowledge sources 50, 52. These minor syntactic modifications are not included here. The SQL INSERT statements in S720, and 736 in FIG. 7 is replaced by a put( ) procedure call, for adding the document Entity and the document Quadruple, respectively into the Temporal Triple Store. UPDATE statements in S732 and S734 are similarly handled by issuing procedure calls to replace the document with its modified version. The method of FIG. 7, modified as explained above would populate the KB implemented by a relational DBMS.

6. Method for Querying the Knowledge Base 34

Querying the knowledge base 34 in the exemplary embodiment of the system 10 can be performed with any suitable KB query language that is based on pattern matching, e.g., Simple Protocol and RDF Query Language (SPARQL) which is standardized by W3 foundation (http://www.w3.org/TR/sparql11-query/), or other RDF query language proposals. In the present invention, a method for processing of queries expressed in SPARQL is explained. Naturally the method applies to other languages as well. A typical SPARQL query has the following basic form that is simplified for the ease of presentation. SPARQL keywords are capitalized; lowercase letters are variables and " . . . " indicates repetition.

SELECT x y . . .
FROM g1 g2 . . .
WHERE (S1 p1 o1) (s2 p2 o2) . . .
FILTER c1 c2 . . .

The variables x and y are the result of the query and they can be any of the variables s1, p1, o1, s2, p2, or o2 which are resources. The variables g1 and g2 represent the source RDF graphs. (s1 p1 o1) and (s2 p2 o2) are triple patterns and they match the triples stored in a KB. Any one of the variables s1, p1, o1, s2, p2, or o2 can be a constant or repeated in different patterns. c1 and c2 are conditions that compare the variables among themselves or with constants.

The KB 34 keeps temporal triples that are formed from temporal resources. To a user the KB 34 is a set of temporal triples as depicted in FIGS. 3C, 3D, 4C, and 4D. Therefore, SPARQL needs to be modified for querying the knowledgebase 34. Call the temporal version TSPARQL. However, the modifications are simple and explained herein. The variables s1 and s2 are temporal subjects; the variables p1 and p2 are temporal predicates; and the variables o1 and o2 are temporal objects. In short they all are temporal resources. So, a variable that appear in WHERE clause matches to the whole temporal resource that is stored in a KB. In comparison formulas, c1 and c2 that appear in the FILTER clause, the components of the temporal resource can be used. Let r be a variable whose value is a temporal resource r.v, r.b, and r.e refer to its Name, Begin and End components, respectively. If r matches to "Tom[1/1/1980, ∞)" then, r.v, r.b, and r.e are Tom, 1/1/1980, and ∞, respectively. The symbols r.v, r.b, and r.e may appear in SELECT and/or FILTER clauses of a TSPARQL query. The variables x and y in SELECT clause can be any one of s1, p1, o1, s2, p2, or o2 or their parts, i.e. r.v, r.b, and r.e.

In SPARQL patterns, constants are commonly used such as (Tom p1 o1) where Tom is a constant. In TSPARQL the same can be accomplished by the pattern" (s1 p1 o1) FILTER s.v=Tom".

Translation of SPARQL to SQL is well understood as explained by B. Elliot, at al., "a complete translation from SPARQL into efficient SQL", IDEAS '09 Proceedings of the 2009 International Database Engineering & Applications Symposium, Pages 31-42. The details are not included here. The translation procedure applies to the translation of TSPARQL queries to SQL queries with minor modifications. Let q be a TSPARQL query and q' be the corresponding SQL query. If any one of r.v, r.b, or r.e appears in q it is directly transferred to q' by the translation process. If any one of the variables, s1, p1, o1, s2, p2, or o2 appears in c1 or c2 it is replaced with its name part, i.e. s1.v for s1 and similarly for the rest of variable. Moreover, the tables in TTS replace g1 in FROM clause, namely the Triple Table and the Entity Table, and some queries may require the inclusion of the Predicate Table as well. These tables are linked in the WHERE clause of the target SQL statement simulating a join operation. There are well known optimization methods for the join operations, which can be further improved by breaking the SQL query into subparts that will execute faster.

FIG. 8 illustrates an exemplary method of querying the knowledge base 34. The method begins at S500.

At S502, access to a knowledge base 34 is provided. At S504, a query 30 is received. The query can be of the general form outlined above. For example, if the query 30 asks for "what is known about Tom" it would be expressed in TSAPRQL as: SELECT p1 o1 FROM g1 WHERE (s1 p1 o1) FILTER s1.v="Tom". The corresponding SQL query statement would be: SELECT T.p1 E.o1 FROM TripleTable T, EntityTable E WHERE (E.Entity).Name="Tom" AND T.Object=(E.Entity).Name. The first condition in the WHERE clause implements the condition of F s1.v="Tom" and the second one implements a join operation between the Entity Table and the Triple Table. Modifying the steps of FIG. 8 according to each method of storage explained in Section 4 would prepare the SQL statement for each method.

At S506 the query is parsed and a list of tokens is generated. For a static query, step S508 passes the token list to step S510 where the SQL statement is directly formed with respect to the Static Triple Store 36 by the conversion method mentioned above. Similarly, S508 passes a temporal query to step S512 where each token is repeatedly processed and at S554 each TSPARQL variable is mapped to the corresponding column name in Temporal Triple Store 38. When processing of all the tokens is completed by the step S516 the final SQL statement is obtained at step S518. For the Triple Table 40 of relational DBMS in Section 4.2 the modified SQL statement would be:

SELECT T.Predicate, T.PBegin, T.PEnd, E.Entity, E.EBegin, E.End FROM TripleTable T, EntityTAble E WHERE T.Subject="Tom" AND T.Object=E.Entity.

For the Triple Table 40 implemented as a JSON document of a Couchebase DBMS in Section 4.3 the SQL statement would be replaced with get( ) procedure calls where the "Subject":"Name"=Tom" would be the call parameter.

At S520 the modified SQL query is executed by the DBMS and result 28 is returned to user at step S522. The method terminates at S524.

The method illustrated in one or more of FIGS. 2, 7, and 8 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in one or more of FIGS. 2, 7 and 8, can be used to implement the methods disclosed herein.

While some exemplary embodiments herein are described in connection with software, such as an application programming interface (API), residing on a computing device, one or more portions of the invention can also be implemented via an operating system, or a "middle man" object, a control object, hardware, firmware, intermediate language instructions or objects, etc., such that the knowledge base and RDF store database designs in accordance with the inventions can be included in, supported in or accessed via all of the languages and services enabled by managed code, such as .NET code, and in other distributed computing frameworks as well.

There are multiple ways of implementing the present invention, e.g., an appropriate API, toll kit, driver code, operating system, control, standalone or downloadable software object, etc. which enables applications and services to use the RDF store database designs and temporal SPARQL and related systems and methods of the invention. The invention contemplates the use of the invention from the standpoint of an API (or other software object), as well as from a software or hardware object that creates and maintains and provides access to an RDF data store in accordance with the invention. Thus, various implementations of the invention described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor it meant to preclude equivalent exemplary structures and techniques known to those of ordinary skill in the art. Furthermore, to the extent that the terms "includes," "has," "contains" and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts can be applied to any computing device or system in which it is desirable to provide faster RDF triplet access. For instance, the temporal RDF store designs techniques of the invention can be applied to the operating system of a computing device, provided as a separate object on the device, as part of another object, a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein can be implemented in connection with hardware or software or, where appropriate, with a combination of both. As used herein, the terms "component," "system" and the like are likewise intended fo refer to a computer-related entity, either hardware, a combination of hardware and software, software, or software in execution. For example, a component can be but is not limited to being, a process running on a processor, a processor, an object, an executable, a thread of execution, a program, and/or a computer. By way of illustration, both and application running on computer and the computer can be a component. One or more components can reside within a process and/or thread of execution and a component can be localized on one computer and/or distributed between two or more computers.

Thus, the methods and apparatus of the present invention, or certain aspects or portions thereof, can take the form of program code (i.e., instructions) embodied in tangible media, such as floppy diskettes, CD-ROMs, hard drives, or any other machine-readable storage medium, wherein, when the program code is loaded into an executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that can implement or utilize the temporal RDF store designs and SPARQL to SQL conversion techniques of the present invention, e.g., through the use of a data processing API, reusable controls, or the like, are preferably implemented in a high level procedural or object oriented programming language to communicate with a computer system. However, the program(s) cam be implemented in assembly or machine language, if desired. In any case, the language can be a complied or interpreted language, and combined with hardware implementations.

The methods and the system of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, portions of the disclosed subject matter can be implemented as a system, method, apparatus, or article of manufacture using standard programming and/or engineering techniques to produce software, firmware, hardware, or nay combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the forgoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, can be provided in order to provide integrated functionality. Any components described herein can also interact with one or more other components not specifically described herein but generally known by those of skill in the art.

In view of the exemplary systems described supra, methodologies that can be implemented in accordance with reference to the flowcharts of FIGS. 2, 7 and 8. While for purposes of simplicity of explanation, the methodologies are shown and described a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks may be required to implement the methodologies described hereinafter.

Furthermore, as will be appreciated various portions of the disclosed systems and methods can include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments can be used or modifications and additions can be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, ant that the methods, as described in the present application can apply to any computing device or environment, such as a gaming console, handheld computer, portable computer, etc., whether wired or wireless and can be applied to any number of such computing devices connected via a communications network, and interacting across the network. Furthermore, it should be emphasized that a variety of computer platforms, including hand held device operating systems and other application specific operating systems are contemplated, especially as the number of wireless networked devices continues to proliferate.

While exemplary embodiments refer to utilizing the present in invention in the context of particular programming language constructs, the invention is not limited, but rather may be implemented in any suitable language to provide temporal RDF store designs, and related methods. Still further, the present invention can be implemented in or across a plurality of processing chips or devices. Therefore, the present invention should not be limited to any single embodiment, but rather should be construed in breadth and scope in accordance with the appended claims.

As will be appreciated, the steps of the FIGS. 2, 7, and 8 need not all proceed in the order illustrated and fewer, more, or different steps may be performed.

What is claimed is:

1. A computer implemented method for representing temporal knowledge in Resource Definition Framework (RDF), for storing RDF temporal knowledge in a Knowledge Base that is managed by a Knowledge Base Management System (KBMS) that utilizes a Data Base Management System (DBMS), and for querying the temporal knowledge stored in the Knowledge Base, the method includes instructions for at least one of creating a temporal RDF triple, adding that triple to the Knowledge Base and querying the RDF temporal knowledge stored in the Knowledge Base, where the Knowledge Base and the KBMS and the DBMS reside in non-transitory computer-readable medium, the method comprises:

creating, in memory, a temporal subject comprising a first value representing a subject, called a Subject Name, and a first period defined by a Begin1 time instant and an End1 time instant where the Begin1 time instant is less than the End1 time instant and where the first period includes all time instants starting from and including the Begin1 time instant up to but not including the End1 time instant;

creating, in memory, a temporal object comprising a second value representing an object, called an Object Name, and a second period defined by a Begin2 time instant and an End2 time instant where the Begin2 time instant is less than the End2 time instant and where the second period includes all time instants starting from and including the Begin2 time instant up to but not including the End2 time instant;

creating, in memory, a temporal predicate comprising a third value representing a predicate, called a Predicate Name, and a third period defined by a Begin3 time instant and an End3 time instant where the Begin3 time instant is less than or equal to the End3 time instant and where the third period includes all time instants starting from and including the Begin3 time instant up to but not including the End3 time instant;

combining, in memory, the temporal subject, the temporal predicate and the temporal object, collectively called as a temporal resource, to form a temporal RDF triple, where the third period is a subset of the overlapping time instants of the first period and the second period;

storing in the Knowledge Base one or more of the temporal subjects or temporal objects, after determining the existence and the time reference of the temporal subject or the temporal object, in one column of an Entity Table that has at least one column where a first value in a row of the Entity Table and a second value in a different row of the Entity Table do not have overlapping periods if the Subject Name of the first value and the Subject Name of the second value are the same or if the Object Name part of the first value and the Object Name of the second value are the same;

storing in the Knowledge Base one or more of the temporal predicate, after determining the existence and time reference of the temporal predicate, in one column of a Predicate Table that has at least one column where a first value in a row of the Predicate Table and a second value in a different row of the Predicate Table do not have overlapping periods if the Predicate Name of the first value and the Predicate Name of the second value are the same;

transforming, in memory, the temporal RDF triple into a quadruple where the first value is a triple Id which is a serial number identifying the temporal RDF triple, the second value is the Subject Name, the third value is the temporal predicate, and the fourth value is the Object Name, and storing in the Knowledge Base one or more of that quadruple in one or more rows of a Triple Table that has at least four columns, one temporal RDF triple for each row;

mapping, in KBMS, the Subject Name in a row of the Entity Table and the Subject Name in a row of the Triple table to link these two tables, the Predicate Name in a row of the Predicate Table and the Predicate Name of the temporal predicate in a row of the Triple Table to link these two tables, and the Object Name in a row of the Entity Table and the Object Name in a row of the Triple table to link these two tables;

parsing the query to an equivalent SQL query that the DBMS processes.

2. The method of claim 1 wherein the Knowledge Base further comprising: a Static Triple Store and a Temporal Triple Store that at least includes the Entity Table and the Predicate Table and the Triple Table.

3. The method of claim 1 wherein the Entity Table has only one column for storing temporal entities and the Entity Table can further be augmented with at least one more column that includes an entity identifier that can further be stored in the subject column of the Triple Table instead of a Subject Name or in the object column of the Triple Table instead of an Object Name for further optimization, efficiency and expansion of the system.

4. The method of claim 1 wherein the Predicate Table has only one column for storing temporal predicates and the Predicate Table can further be augmented with at least one more column that includes a predicate identifier that can further be stored in the Predicate column of the Triple Table instead of a Predicate Name for further optimization, efficiency and expansion of the system.

5. The method of claim 1, wherein the Entity Table, the Predicate Table and the Triple Table, respectively do not have conflicting rows such that:

a first row in one of these tables and a second row in the same table, for each column respectively may not have overlapping periods, wherein the period of the first row does not overlap with the period of the second row if the Subject Name, Object Name and Predicate Name in the first row is the same as the Subject Name, Object Name or Predicate Name in the second row.

6. The method of claim 1, wherein a temporal entity or a temporal predicate in the Entity Table or the Predicate Table, respectively, can be changed, deleted or a new temporal entity or a new temporal predicate can be added to the Entity Table or the Predicate Table, respectively independent of adding temporal triples to the Temporal Triple Store of the Knowledge Base.

7. The method of claim 1, wherein the Entity Table and/or the Predicate Table can be eliminated and the Entity Table may be merged into the Triple Table by placing the temporal entities of the Entity Table into the subject and the object columns of the Triple Table, respectively.

8. The method of claim 1, wherein the DBMS may be replaced by a relational DBMS, or by a NoSQL DBMS, or by an object relational DBMS, or a native triple store, or by any other DBMS software by changing the definitions of the Entity Table, the Predicate Table, and the Triple Table according to the definitional requirements of these DBMS.

9. The method of claim 7, wherein the first column of the Triple Table that stores the triple Id can be eliminated.

10. The method of claim 1 temporal resource with time instant may be represented as a temporal resource with a period whose Begin and End are equivalent to that time instant or End is one time unit larger than that time instant.

11. The method of claim 1, comprising wherein regular RDF triples without time can coexist with temporal triples in the Knowledge Base wherein the Static Triple Store and the Temporal Triple Store are implemented separately or the Static Triple Store is merged into the Temporal Triple Store.

12. The method of claim 1 further comprising the Triple Table wherein the Triple Table can be augmented by additional information such as an indicator column whose values indicate the type of an object in a triple wherein an entity, a literal or the data type of the literal is specified for further optimization and efficiency of the system.

13. The method of claim 1 comprising wherein if time instants are included in creating the temporal subject, the temporal predicate, and the temporal object of a temporal triple, time reference of these temporal resources defaults to a period whose Begin and End are the temporal resource's time instant and infinity, respectively.

14. The method of claim 1 comprising wherein the KBMS includes instructions for querying the knowledge base, and the instructions are configured for:

receiving a query comprising at least one or more of:
a temporal subject, a temporal predicate, or a temporal object or any one part of these temporal resources as the query result;
a triple pattern formed by a temporal subject, a temporal predicate, and a temporal object;

a comparison of the Name, the Begin or the End parts of a first temporal resource with the Name, the Begin, the End parts of a second temporal resource;

a comparison of the Name, the Begin or the End parts of a temporal resource with a literal of the same type; and where the query matches to the temporal triples in the Triple Table and the Entity Table and the matching triples are filtered by the comparison conditions to generate the query result that is delivered to the machine or user who posed the query.

15. The method of claim 1 further comprising:

providing a Knowledge Base comprising a Static Triple Store and a Temporal Triple Store comprising an Entity Table including rows, one row for each temporal subject or temporal object in a temporal triple, a Predicate Table including rows, one row for each temporal predicate and a Triple Table including rows, each of which, stores a triple Id which is a serial number identifying a temporal triple, a Subject Name of the temporal subject, the temporal predicate, and a Object Name of the temporal object of a respective temporal triple as a quadruple;

with a processor, for each plurality of candidate temporal triples to be added to the knowledge base, each of the candidate triple in a set comprising a subject, an object, a predicate, a Begin and an End which are the beginning and ending instants of a time period, herein called Iperiod, that designates the period of the predicate, or a temporal triple made up of a temporal subject, a temporal predicate, and a temporal object, referred herein as ts, tp, and to, respectively:

determining if the predicate or tp exists in the Predicate Table, if so, retrieving its time reference from the Predicate Table and verifying that the Iperiod or tp's period is a subset of the retrieved period, if the predicate does not exist in the Predicate Table creating a temporal predicate by concatenating the predicate by the Begin and the End and inserting that temporal predicate into the Predicate Table otherwise inserting tp into the Predicate Table;

determining if the subject or ts exists in the Entity Table, if so, retrieving its time reference from the Entity Table and verifying that the Iperiod or ts's period is a subset of the retrieved period, if the subject does not exist in the Entity Table creating a temporal subject by concatenating the subject, the Begin and the End, and inserting that temporal subject into the Entity Table otherwise inserting ts into the Entity Table;

determining if the object or to, that is not a literal, exists in the Entity Table, if so, retrieving its time reference from the Entity Table and verifying that the Iperiod or to's period is a subset of the retrieved period, if the object does not exist in the Entity Table creating a temporal object by concatenating the object, the Begin and the End, and inserting that temporal object into the Entity Table otherwise inserting ts into the Entity Table, if object is a literal its time reference, herein Begin and End, defaults to negative infinity and positive infinity, respectively;

replacing the time period of the subject in the Entity Table by a newly computed period that includes all the retrieved time instants and all the time instants in Iperiod and the time period of the object in the Entity Table by a newly computed period that includes all the retrieved time instants and all the time instants in Iperiod;

constructing a quadruple by including the next serial value for the triple id, the subject or the Subject Name of ts, the predicate concatenated by the period defined by Begin, and End or tp, and the object or the Object Name of to and inserting that quadruple into the Triple Table.

16. The method of claim 2 comprising a memory configured to store instructions and a processor in communication with the memory for executing the instructions.

* * * * *